(12) United States Patent
Christen et al.

(10) Patent No.: US 10,839,617 B2
(45) Date of Patent: Nov. 17, 2020

(54) METHOD AND APPARATUS FOR CROWD-ASSISTED PROGNOSTICS AND DIAGNOSTICS

(71) Applicant: FORD GLOBAL TECHNOLOGIES, LLC, Dearborn, MI (US)

(72) Inventors: Erik J. Christen, Royal Oak, MI (US); Mahmoud Abdelhamid, Canton, MI (US); Yang Yang, Belleville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/919,629

(22) Filed: Mar. 13, 2018

(65) Prior Publication Data

US 2019/0287317 A1    Sep. 19, 2019

(51) Int. Cl.
| | | |
|---|---|---|
| *G07C 5/00* | (2006.01) | |
| *G07C 5/08* | (2006.01) | |
| *H04W 4/46* | (2018.01) | |
| *G01S 13/931* | (2020.01) | |
| *G01S 7/41* | (2006.01) | |
| *G01S 7/48* | (2006.01) | |
| *H04N 7/18* | (2006.01) | |
| *G01S 17/931* | (2020.01) | |
| *G08B 21/02* | (2006.01) | |
| *H04W 76/10* | (2018.01) | |

(52) U.S. Cl.
CPC ............. *G07C 5/008* (2013.01); *G01S 7/41* (2013.01); *G01S 7/4802* (2013.01); *G01S 13/931* (2013.01); *G01S 17/931* (2020.01); *G07C 5/006* (2013.01); *G07C 5/0808* (2013.01); *G07C 5/0816* (2013.01); *H04N 7/185* (2013.01); *H04W 4/46* (2018.02); *G08B 21/02* (2013.01); *H04W 76/10* (2018.02)

(58) Field of Classification Search
CPC ...... G07C 5/008; G07C 5/006; G07C 5/0816; G07C 5/0808; G01S 7/41; G01S 7/4802; G01S 13/931; G01S 17/936; H04W 4/46; H04W 76/10; H04N 7/185
See application file for complete search history.

(56) References Cited

U.S. PATENT DOCUMENTS

| | | | |
|---|---|---|---|
| 7,363,117 B2 | 4/2008 | Tengler et al. | |
| 8,229,663 B2 | 7/2012 | Zeng et al. | |
| 9,589,464 B2 | 3/2017 | Rovik et al. | |
| 9,805,601 B1 * | 10/2017 | Fields | G08G 1/096791 |
| 2008/0015771 A1 * | 1/2008 | Breed | B60N 2/2863 701/300 |
| 2008/0040023 A1 * | 2/2008 | Breed | B60N 2/2863 701/117 |

(Continued)

*Primary Examiner* — Behrang Badii
*Assistant Examiner* — Daniel L Greene
(74) *Attorney, Agent, or Firm* — Michael Spenner; Brooks Kushman P.C.

(57) ABSTRACT

A system includes a vehicle-processor in communication with an external vehicle sensor, wherein the processor is configured to detect another vehicle within a predefined proximity. The processor is further configured to instruct the external vehicle sensor to scan a characteristic of the another vehicle, responsive to the detecting. Also, the processor is configured to determine if the characteristic includes an anomaly, responsive to the scan and notify the driver of the another vehicle of the anomaly, responsive to the determination.

20 Claims, 3 Drawing Sheets

(56) References Cited

U.S. PATENT DOCUMENTS

| | | | | |
|---|---|---|---|---|
| 2011/0251800 A1* | 10/2011 | Wilkins | .................... | G01J 3/02 |
| | | | | 702/24 |
| 2012/0323474 A1* | 12/2012 | Breed | ................... | B60W 30/04 |
| | | | | 701/117 |
| 2014/0306826 A1* | 10/2014 | Ricci | ....................... | H04W 4/21 |
| | | | | 340/573.1 |

* cited by examiner

US 10,839,617 B2

METHOD AND APPARATUS FOR CROWD-ASSISTED PROGNOSTICS AND DIAGNOSTICS

TECHNICAL FIELD

The illustrative embodiments generally relate to methods and apparatuses for crowd-assisted prognostics and diagnostics.

BACKGROUND

Certain issues, such as open fuel/charge doors, burnt out lights, objects on a car roof, etc., are sometimes difficult for a driver to notice about their own vehicle while driving. If another driver notices such an issue while both vehicles are moving however, it can be a difficult task to alert the driver of the vehicle having the issue. Unless a stop is present, the noticing driver may have to attempt to yell at the other driver while driving, which can create a number of distraction issues. Also, drivers may be hesitant to "engage" with other drivers, feeling like this is an intrusion into privacy, even though the driver experiencing the issue might appreciate the notification.

SUMMARY

In a first illustrative embodiment, a system includes a vehicle-processor in communication with an external vehicle sensor, wherein the processor is configured to detect another vehicle within a predefined proximity. The processor is further configured to instruct the external vehicle sensor to scan a characteristic of the another vehicle, responsive to the detecting. Also, the processor is configured to determine if the characteristic includes an anomaly, responsive to the scan and notify the driver of the another vehicle of the anomaly, responsive to the determination.

In a second illustrative embodiment, a system includes a processor configured to scan a proximate vehicle using external vehicle sensors to detect identifying characteristics and an anomaly on the proximate vehicle. The processor is also configured to attempt direct communication with the proximate vehicle and responsive to a direct communication failure, broadcast the identifying characteristics in conjunction with the anomaly.

In a third illustrative embodiment, a system includes a processor configured to receive a broadcast including vehicle identifying characteristics. The processor is also configured to self-determine that the broadcast is directed at a vehicle including the processor based on the vehicle identifying characteristics identifying the vehicle. Further, the processor is configured to attempt to wirelessly connect to a scanning vehicle, responsive to the self-determination and the broadcast including communication credentials.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
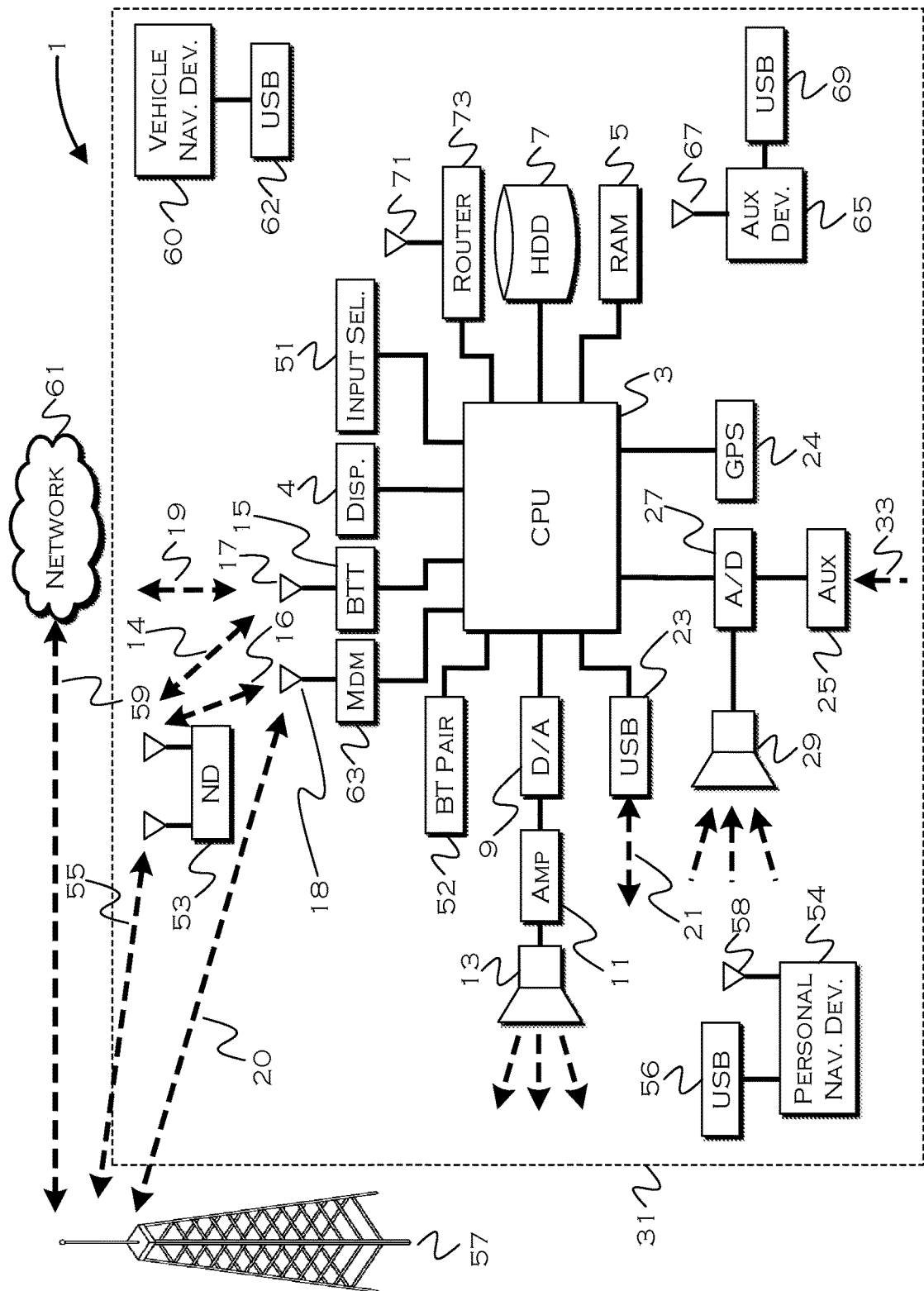
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

The illustrative embodiments describe a system for providing prognostics and diagnostics to nearby vehicles. Specifically, nearby vehicles would notify the other drivers of any detected failure, by sending a message/reminder. This may alert a driver to any observable but unknown issues, upon which notification the notified driver can pursue a solution/fix.

An illustrative system includes diagnostics and communication. Vehicles can perform diagnostics on surrounding vehicles via using onboard cameras to sense visual anomalies and sensors to sense detectable anomalies. The visual anomalies could include, for example, fuel/charge port door open, taillight, headlight, or other lamp out, door/trunk ajar, object on top of car, fluid leak underneath vehicle, low tire pressure or tire/axle wobble; foreign object caught underneath vehicle, etc. Many of these anomalies could also be detected by sensors, and sensors can further detect unexpected conditions that may be more difficult to visually observe.

Of course, discovering the problem is only half of the solution, because the vehicle doing the discovery is not the vehicle experiencing the problem. Accordingly, the illustrative embodiments provide for communication of the problem to the problem-experiencing vehicle/driver. In this way, vehicles can diagnose and report data on surrounding vehicles.

When a failure or possible failure is detected on nearby vehicle, the system may generate a message with the detected failures or potential failures status for that vehicle. Then the detecting vehicle may start communicating and pairing with the target vehicle. This communications can be performed using methods such as using BLUETOOTH, WI-FI, 4G/LTE, or any other suitable methods. If direct communication cannot be established, the detecting vehicle may broadcast vehicle identifying characteristics (of the intended recipient vehicle) and the attendant error state(s). Local vehicles detecting the broadcast can then attempt to self-identify to determine if they are the intended recipient.

If direct communication is possible, once the fault is detected and the handshake between the two vehicles is confirmed, the fault detecting vehicle may sends a message/reminder to the other vehicle. The driver of the recipient vehicle can be notified through many a visual message pop-up on the vehicle's center stack screen or an audible alert.

Figure 2:
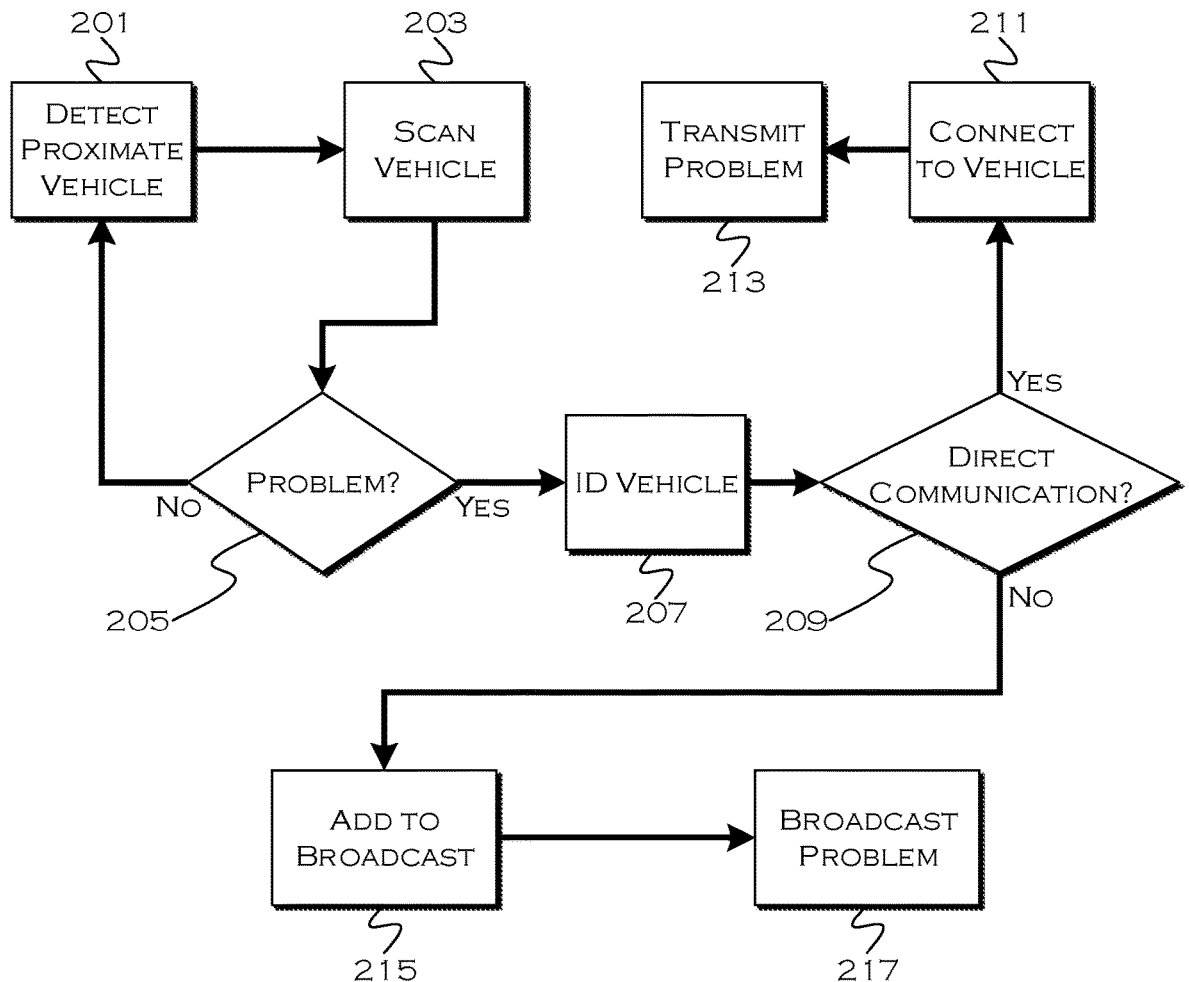
FIG. 2 shows an illustrative issue detection process.

FIG. 2 shows an illustrative issue detection process. This process can leverage existing vehicle systems and sensors, such as external cameras included for park-assist, and sensing options included for obstacle detection and other proximity analysis.

The overhead for using onboard sensors and cameras while a vehicle is traveling may be very low. Cameras can quickly snap pictures and sensors can quickly receive data relating to proximate vehicles. The data returned by these queries can be processed onboard a vehicle or can be sent to the cloud for analysis. In this example, the detecting vehicle determines 201 that another vehicle is within an appropriate proximity. Responsive to detecting the vehicle, the detecting vehicle performs a diagnostic scan 203 of the exterior of the proximate vehicle. This scan can include, for example, using a camera to detect an unexpected object or surface profile that would be caused by an open door or dragging object. In another example, LIDAR or RADAR can be used to detect more discrete anomalies that may not be visually recognizable. In still other examples, the process may be able to detect tire pressure states, objects on a rooftop, and other easily-rectifiable, but not necessarily onboard-detectable conditions.

The scan of another vehicle can be generalized or can relate to a specific element or characteristic of the vehicle. Scan results can be analyzed onboard the scanning vehicle, or can be sent to a remote server for processing. Detection of anomalies in the characteristics can be achieved by comparison to expected characteristic values, or by application of certain formulas that reveal a flaw. For example, tires of a certain type moving at a certain speed on a certain vehicle may have an acceptable amount of visible ground-contact, and if the air pressure is low, this ground contact may be visually observable. In another example, a RADAR scan of a rear quarter-panel may reveal an unexpected topographical anomaly, which can correspond to an open door (or a dent). A visual inspection of the same element may result in an image in which the anomaly can be detected by an image recognition program (via unexpected bumps or shadows).

If the scanning vehicle detects 205 a problem, the vehicle may attempt to identify the other vehicle that includes the problem. This can include body-type identification, color, make, model or other identification observable through visual attributes. In some instances, where only a few or two vehicles are present, it may be fairly easy to identify the vehicle with confidence, but in heavy traffic the sensing vehicle may have to resort to a broadcast of the vehicle's sensed identification characteristics and rely on the sensed vehicle to self-identify.

If the sensed vehicle responds to a direct communication request or a broadcast including a direct communication request 207, such as by returning communication credentials, the process may use those credentials to directly connect 211 to the vehicle. The detecting vehicle may then use the direct connection to transmit 213 the detected potential flaws or anomalies.

If the sensed vehicle cannot directly communicate with the sensing vehicle, the sensing vehicle may broadcast 215 a suspected identity of the sensed vehicle (e.g., make, model, color, etc) and include 217 the identified error. The sensed vehicle may then have to self-select from the broadcast, and so if two vehicles of a similar or the same make, model, color, etc. are both within a broadcast range, there may be occasions where this process results in a false positive.

Figure 3:
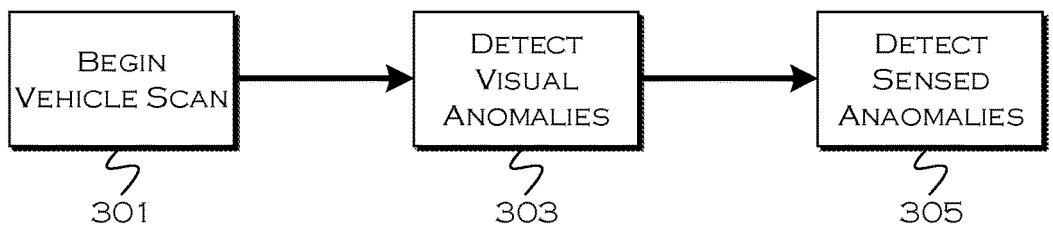
FIG. 3 shows an illustrative scanning process.

FIG. 3 shows an illustrative scanning process. As previously discussed, this scan can be run 301 by any vehicle having one or more external-capable sensors, which are capable of detecting anomalies in a characteristic of another vehicle. The scan can include 303 a visual anomaly detection using one or more cameras. This portion of the scan can look for unexpected color variation, object or line distention and outline anomalies, amongst other things.

The process may also include a LIDAR/RADAR/Sensor scan, which can measure relative distances and surface profiles. This scan can reveal smaller anomalies, anomalies during the night-time (when a camera may be insufficient) and unexpected topographical variances. In many cases, these scans can be run using cameras and sensors already included in vehicles, and since vehicles tend to engage with other vehicles from a variety of directions when traveling, it may be possible to observe a fairly complete inspection of a vehicle exterior during a relatively short drive, assuming the observed vehicle interacts with a certain amount of traffic.

Figure 4:
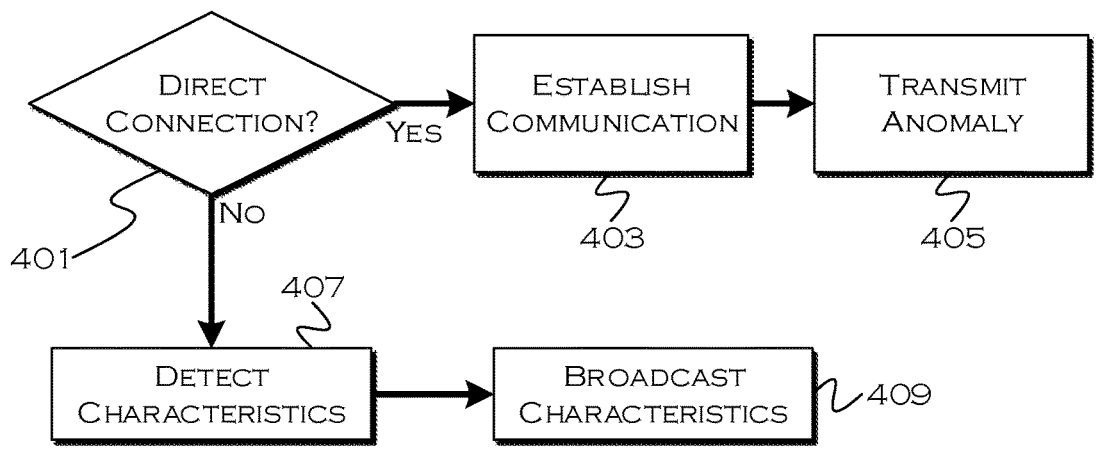
FIG. 4 shows an illustrative error communication request process.

FIG. 4 shows an illustrative error communication request process. In this example, the sensing vehicle attempts to communicate sensed anomalies to the scanned vehicle. If there is only a single other vehicle present, for example, the sensing vehicle can broadcast a localized handshake request for direct communication. Other suitable methods of directly communicating with a proximate vehicle are also acceptably within the scope of the illustrative embodiments. For example, the scanning vehicle may broadcast scanned-vehicle characteristics, which a scanned vehicle may receive and self-identify. The broadcast may also include scanning-vehicle credentials, so the scanned vehicle may use those credentials and the self-identification as the basis for requesting a handshake with the scanning vehicle.

Accordingly, the scanning vehicle instructs cameras or sensors to scan a proximate vehicle. In addition to detecting anomalies, the camera or sensors may detect other characteristics such as vehicle type (compact, sedan, SUV, etc), color and even make and model determinations may be possible based on observed vehicle characteristics.

If the scanned vehicle is within a sufficiently short range, and/or there are few or no other vehicles present, the scanning vehicle may broadcast a connection request, including connection credentials. Alternatively, vehicles may persistently or periodically broadcast connections credentials for diagnostic connection purposes, and the scanning vehicle may detect the credentials and complete a handshake. If a direct connection is achieved 401, the scanning vehicle and scanned vehicle may establish 403 short range communication, and the scanning vehicle may then transmit 405 an anomalous condition.

If direct connection cannot be established, the scanning vehicle may detect 407 the physical characteristics that allow the scanned vehicle to self-identify. This data can then be included 409 in a broadcast, which may only occur if an anomaly is also detected. If the scanning vehicle generates such a broadcast, the scanning vehicle may also include direct connection credentials. If the scanned vehicle detects the broadcast, and is able to self-identify, the two vehicles may handshake because the scanned vehicle can retrieve connection credentials for the scanning vehicle from the broadcast. If the connection credentials are not included, the broadcast may simply include the identification of the scanned vehicle and any detected anomalies. In that instance, when the scanned vehicle self-identifies, the scanned vehicle may simply retrieve the anomaly data from the broadcast as well.

Figure 5:
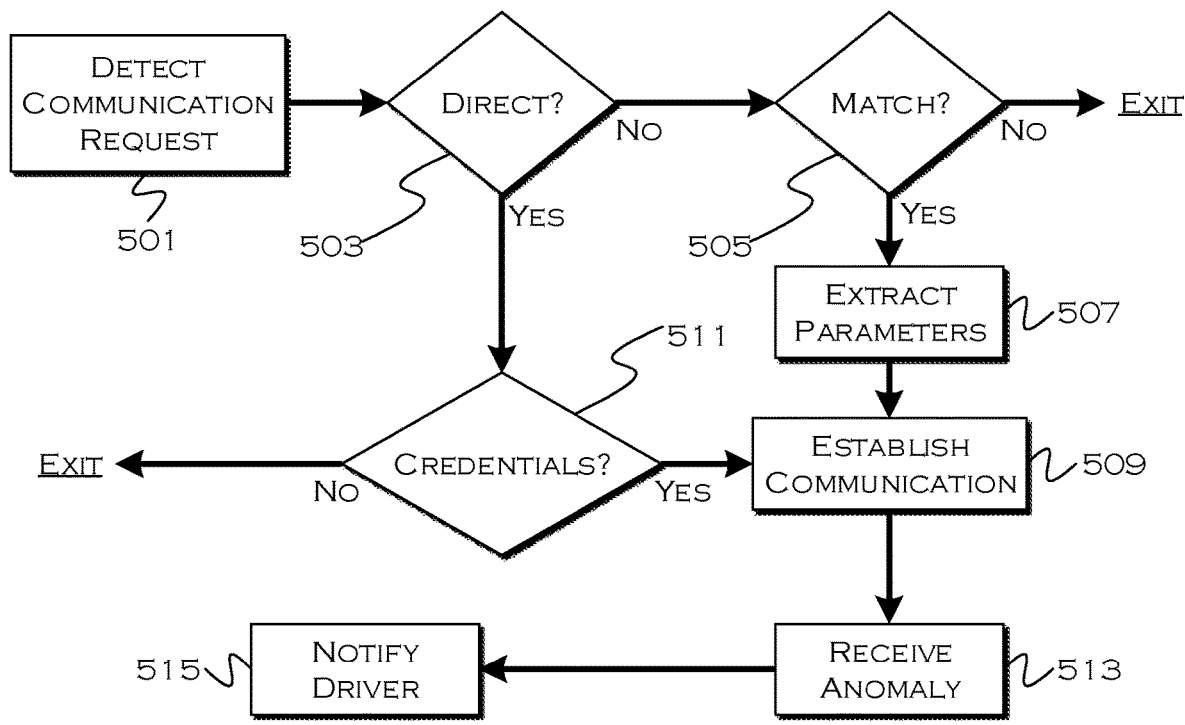
FIG. 5 shows an illustrative error communication handling process.

FIG. 5 shows an illustrative error communication handling process. This is an example of a process that can execute on behalf of the scanned vehicle, allowing the scanned vehicle to receive anomaly information and inform the driver of such information.

In this example, the process may detect 501 a communication request. If the scanned vehicle is broadcasting connection credentials so that other vehicles may inform it of detected anomalies, the communication request may include those credentials. In another example, the scanned vehicle may have transmitted the connection credentials in response to self-identifying itself based on characteristics included in a broadcast, the broadcast also including a connection request.

If the connection corresponds to 503 direct connection, the process may check the credentials 511 included in the request. If the credentials are proper, the scanned vehicle may handshake to establish 509 connection with the scanning vehicle.

In other examples, the received communication may be in the form of a broadcast that includes scanned vehicle identifying characteristics, and/or scanning vehicle communication parameters, and/or anomaly identification data. If the broadcast identifies the scanned vehicle (that is, if the scanned vehicle can self-identify based on the identifying characteristics in the broadcast), the process may extract 507 any included communication parameters and handshake 509 with the scanning vehicle.

In other examples, the broadcast may simply include the anomaly data, and in those cases the self-identifying vehicle can simply extract the anomaly data.

Once direct communication with the scanning vehicle is established, the process may receive 513 identification of the anomaly from the scanning vehicle. This can be any data observed to represent a likely anomaly, although the receiving vehicle may filter some data based on known false positives and/or known defects already reported and of which the driver of the scanned vehicle is aware. Any data deemed appropriate for reporting after any filtering (if any) is completed, may then be reported 515 to the driver via visual or audible alert.

The illustrative embodiments allow for improved vehicle diagnostics leveraging proximate vehicles and existing sensing technology. By leveraging other vehicles to perform exterior scans, owners can receive pertinent and timely notifications of observed anomalies, which may help the owner address a minor condition before it becomes a major one.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
    a vehicle-processor in communication with an external vehicle sensor, wherein
    the processor is configured to:
    detect another vehicle within a predefined proximity;
    instruct the external vehicle sensor to scan a physical body characteristic of the another vehicle, responsive to the detecting;
    determine if the characteristic includes an anomaly representing an irregular state of a physical element of the vehicle exterior of the another vehicle, responsive to the scan; and
    notify the driver of the another vehicle of the anomaly, responsive to the determination.

2. The system of claim 1, wherein the anomaly includes an open door.

3. The system of claim 1, wherein the anomaly includes an abnormal tire state.

4. The system of claim 1, wherein the anomaly includes foreign object detection.

5. The system of claim 1, wherein the anomaly is indicative of a needed repair.

6. The system of claim 1, wherein the external vehicle sensor includes a camera.

7. The system of claim 1, wherein the external vehicle sensor includes RADAR or LIDAR.

8. The system of claim 1, wherein the processor is configured to notify the another vehicle via direct vehicle to vehicle communication.

9. The system of claim 1, wherein the processor is configured to notify the another vehicle via a wireless broadcast including a detected characteristics of the another vehicle.

10. The system of claim 1, wherein the processor is configured to determine if the characteristic includes an anomaly by sending scan results to a remote server and receiving an analysis.

11. The system of claim 1, wherein the processor is configured to determine if the characteristic includes an anomaly by comparing scan results to expected scan results for the characteristic.

12. A system comprising:
a processor configured to:
scan a proximate vehicle using external vehicle sensors to detect identifying characteristics and an anomaly representing an irregular state of a physical exterior of the proximate vehicle;
attempt direct communication with the proximate vehicle; and
responsive to a direct communication failure, broadcast the identifying characteristics in conjunction with the anomaly.

13. The system of claim 12, wherein the processor is configured to attempt direct communication based on detecting communication credentials transmitted by the proximate vehicle.

14. The system of claim 12, wherein the processor is configured to attempt direct communication by broadcasting connection credentials and the identifying characteristics.

15. The system of claim 14, wherein the processor is further configured to attempt direct communication by responding to a request from the proximate vehicle, including the connection credentials included in the broadcast, broadcast from the proximate vehicle in response to the proximate vehicle self-identifying based on the identifying characteristics.

16. A system comprising:
a processor configured to:
receive a broadcast including vehicle identifying characteristics;
self-determine that the broadcast is directed at a vehicle including the processor based on the vehicle identifying characteristics identifying the vehicle;
attempt to wirelessly connect to a scanning vehicle, responsive to the self-determination and the broadcast including communication credentials.

17. The system of claim 16, wherein the processor is further configured to receive an identified vehicle anomaly over a direct communication channel, responsive to establishing a wireless connection.

18. The system of claim 17, wherein the processor is configured to alert a driver responsive to receiving the anomaly.

19. The system of claim 16, wherein the processor is configured to:
extract an identified vehicle anomaly from the broadcast, responsive to the self-determination and the broadcast including identification of the anomaly.

20. The system of claim 19, wherein the processor is configured to alert a driver responsive to extracting the anomaly.

* * * * *